United States Patent
van Manen

(10) Patent No.: US 6,475,424 B1
(45) Date of Patent: Nov. 5, 2002

(54) MULTI-PROCESS MOLDING METHOD AND ARTICLE PRODUCED BY SAME

(75) Inventor: Dick T. van Manen, Canandaigua, NY (US)

(73) Assignee: Cambridge Industries, Inc., Madison Heights, MI (US)

( * ) Notice: Subject to any disclaimer, the term of this patent is extended or adjusted under 35 U.S.C. 154(b) by 0 days.

(21) Appl. No.: 09/079,096

(22) Filed: May 14, 1998

(51) Int. Cl.[7] .............................................. B29C 49/06
(52) U.S. Cl. ...................... 264/513; 264/512; 264/255; 264/259; 264/271.1; 264/279
(58) Field of Search .................................. 264/513, 512, 264/515, 255, 259, 271.1, 279, 28, 526, 331.16

(56) References Cited

U.S. PATENT DOCUMENTS

| | | |
|---|---|---|
| 4,321,029 A | 3/1982 | Aoki |
| 4,470,785 A * | 9/1984 | Koorevaar .................. 264/513 |
| 4,609,516 A | 9/1986 | Krishnakumar et al. |
| 4,743,481 A * | 5/1988 | Quinlan et al. ............. 264/259 |
| 4,797,244 A | 1/1989 | Sauer |
| 5,057,266 A | 10/1991 | Belcher |
| 5,194,212 A | 3/1993 | Bonnett |
| 5,198,174 A | 3/1993 | Nakagawa et al. |
| 5,245,955 A * | 9/1993 | Husted ..................... 264/271.1 |
| 5,258,159 A * | 11/1993 | Freeman et al. ............ 264/513 |
| 5,445,782 A | 8/1995 | Sadr |
| 5,693,284 A | 12/1997 | Mukawa |
| 5,699,835 A * | 12/1997 | Nakagawa et al. ......... 138/141 |
| 5,851,456 A * | 12/1998 | Mukawa et al. ............ 264/513 |

FOREIGN PATENT DOCUMENTS

| | | | |
|---|---|---|---|
| EP | 0 465 169 A1 | 1/1992 | |
| GB | 2 138 736 A | 10/1984 | |
| JP | 57-7702 | * 1/1982 | .................. 264/513 |
| JP | 59-142118 | * 8/1984 | .................. 264/512 |
| JP | 62 77908 | 4/1987 | |
| JP | 3-284915 | 3/1990 | |
| JP | 4-103319 A | 4/1992 | |
| JP | 407125050 A | 5/1995 | |

* cited by examiner

Primary Examiner—Suzanne E. McDowell

(57) ABSTRACT

A method of manufacturing a multi-layered plastic manifold (10) including molding an outer layer (22) of the manifold (10) about a blow molded core insert (20). The outer layer (22) is molded by either a thermoplastic injection molding process or a urethane casting process. While the outer layer (22) is being molded, the pressure and temperature within the core insert (20) are controlled to preserve the structural integrity of the core insert (20).

8 Claims, 5 Drawing Sheets

MULTI-PROCESS MOLDING METHOD AND ARTICLE PRODUCED BY SAME

TECHNICAL FIELD

This invention relates to a method for making a molded article and, more specifically, a manifold.

BACKGROUND OF THE INVENTION

Plastic air-intake manifolds for internal combustion engines have become popular due to their light weight, durability, and relatively low cost of the raw plastic material. There are currently several different processes for manufacturing plastic air-intake manifolds. One method involves injection molding a plastic manifold about a metal core insert in which the metal has a lower melting temperature than the plastic. After the manifold has been molded, the manifold is heated to a temperature sufficient to melt the core insert without melting the manifold. The metal is then captured and reused to form another core insert. This method, known as a "lost core" method, is both expensive and labor intensive to use.

Another method involves injection molding two separate halves of a manifold which are then vibration welded together. Because the manifold is not manufactured as a single piece, there is a risk that the molded halves will separate along the welded seam or that the manifold will leak between the molded halves.

Another known method involves forming a manifold by blow molding. Flanges are added to blow molded tubular portions of the manifold by a subsequent injection molding process. Unfortunately, it is very difficult to blow mold the complex shapes required for most manifolds. Further, many manifolds require areas of varying thickness which cannot be generated with a blow molding process.

Other methods of making hollow objects out of moldable materials are known. For example, one such method involves extruding a plastic parison within a mold cavity and inflating it to form a blow molded article. Pressure is then reduced within the mold cavity to pull the blow molded article away from the mold and create a gap between the article and the mold. Next, plastic material is injected within the mold to form an injection molded layer surrounding the blow molded article. Unfortunately, if the blow molded article does not retract from the mold in a perfectly uniform manner, the final product will have an irregular inner surface and will not have a uniform thickness. Further, a thin walled blow molded article could collapse or disintegrate when contacted by high temperature, high pressure injection molded material.

What is needed is an improved method of forming a plastic article such as an intake manifold that provides the benefits of injection molding to create smooth, complex surfaces without requiring an expensive "lost core" method of operation.

SUMMARY OF THE INVENTION

The present invention provides a method of manufacturing a molded article. The method includes inflating a blow moldable article within an interior cavity of a first mold to form a blow molded article having an outer surface, inserting the blow molded article within an interior cavity of a second mold which substantially envelops the blow molded article and is larger than the interior cavity of the first mold, and injecting moldable fluid material within the interior cavity of the second mold adjacent the outer surface of the blow molded article. During the injecting step, sufficient pressure is applied within the blow molded article to substantially maintain the shape of the blow molded article against the inwardly directed force of the moldable fluid material injected into the mold.

The present invention also provides a method of manufacturing a molded article comprising the steps of inflating a blow moldable article to form a blow molded article having an outer surface, inserting the blow molded article within an interior cavity of a mold, and inserting moldable fluid material within the interior cavity of the mold adjacent the outer surface of the blow molded article. While the moldable fluid material is being inserted, cooling fluid is applied within the blow molded article at a temperature sufficient to maintain the shape of the blow molded article. The temperature of the cooling fluid is selected based on the melting temperature of the blow molded article and the heat transfer from the moldable fluid material to prevent the blow molded article from losing structural integrity due to heat transfer from the moldable fluid material.

The present invention also provides a method of manufacturing a multi-layered manifold comprising the steps of inflating a blow moldable article within an interior cavity of a first mold to form a blow molded inner layer of the manifold, inserting the blow molded inner layer within an interior cavity of a second mold which substantially envelops the blow molded inner layer and is larger than the interior cavity of the first mold, and injecting moldable fluid material within the interior cavity of the second mold to form an outer layer of the manifold which substantially surrounds the blow molded inner layer. During the injecting step, pressure is maintained within the blow molded inner layer to substantially maintain the shape of the blow molded inner layer.

The present invention also provides a molded article including a blow molded inner core formed by inflating a blow moldable article within an interior cavity of a first mold. The article also includes an injection molded outer layer formed by inserting the inner core within a second mold having an interior cavity larger than the interior cavity of the first mold, injecting moldable fluid material within the second mold to substantially envelop the inner core, and maintaining pressure within the blow molded inner core sufficient to substantially maintain the shape of the blow molded inner core.

With the present invention, a blow molded article can be inexpensively formed and then used as an insert during an injection molding process. By applying pressure within the blow molded insert during injection molding, the integrity of the blow molded insert is maintained. Thus, the present invention provides the benefits of injection molding without requiring either a "lost core" method or a method in which the final product is formed in sections which must be welded together.

Further, the use of a temperature-controlled fluid within the blow molded insert while the outer layer is formed prevents deterioration of the structural integrity of the insert resulting from heat transfer from the high temperature molding fluid used to form the outer layer.

DESCRIPTION OF THE DRAWINGS

The invention will now be described in detail with reference to the accompanying drawings, wherein.

BEST MODE FOR CARRYING OUT THE INVENTION

Figure 1:
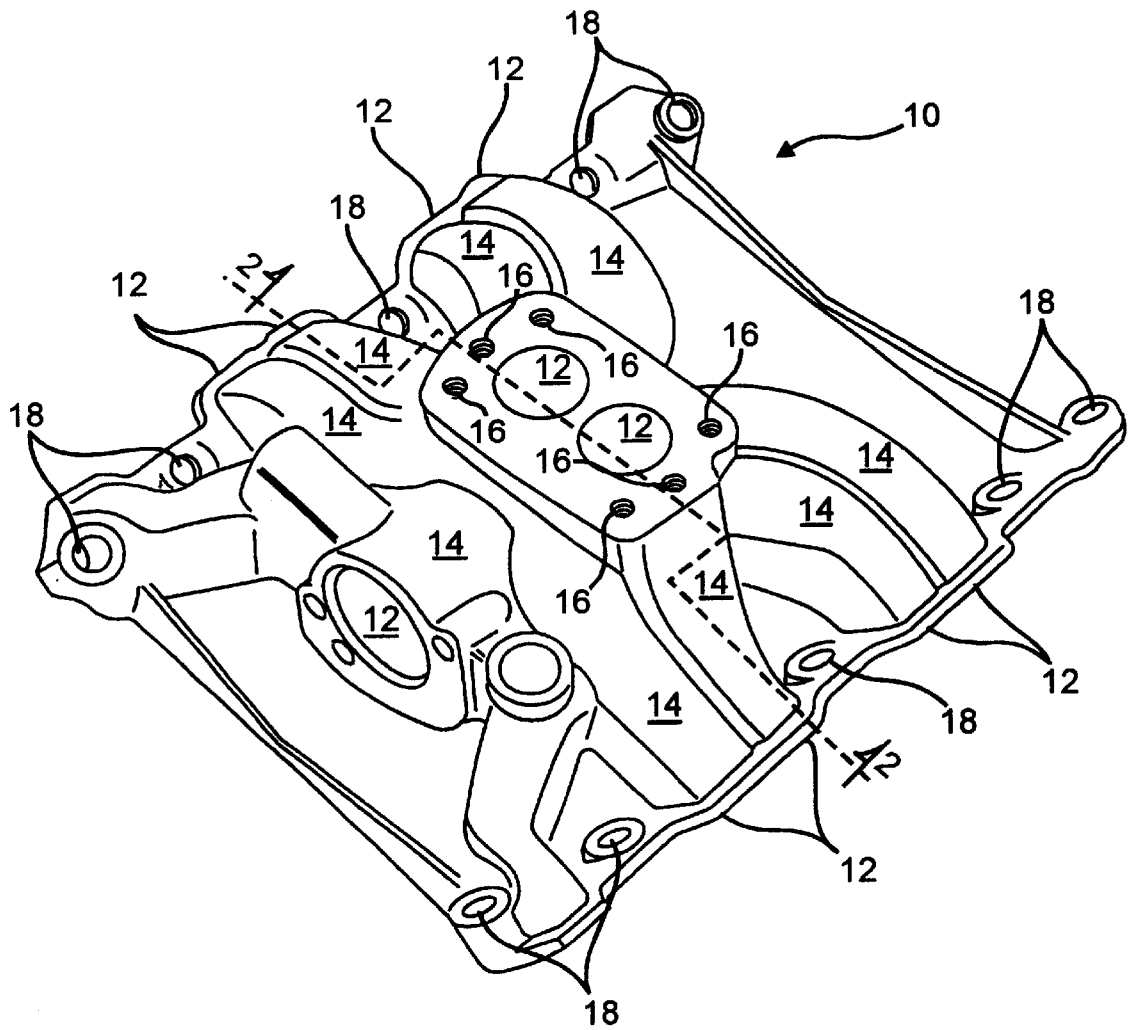
FIG. 1 is a perspective view of a manifold.

The present invention relates to a method of forming a molded article such as an automotive air-intake manifold. The manifold is shown at 10 in FIG. 1 and includes numerous ports 12 which provide access to fluid passages 14 contained within the manifold 10. The manifold 10 includes a plurality of threaded holes 16 and mounting holes 18 designed to permit the manifold 10 to be securely joined with other associated components (not shown) in the engine compartment. As shown in the cross-sectional view of FIG. 4, the manifold 10 includes an inner core 20 which is integrally bonded with, and encased by, an outer layer 22.

Figure 2:
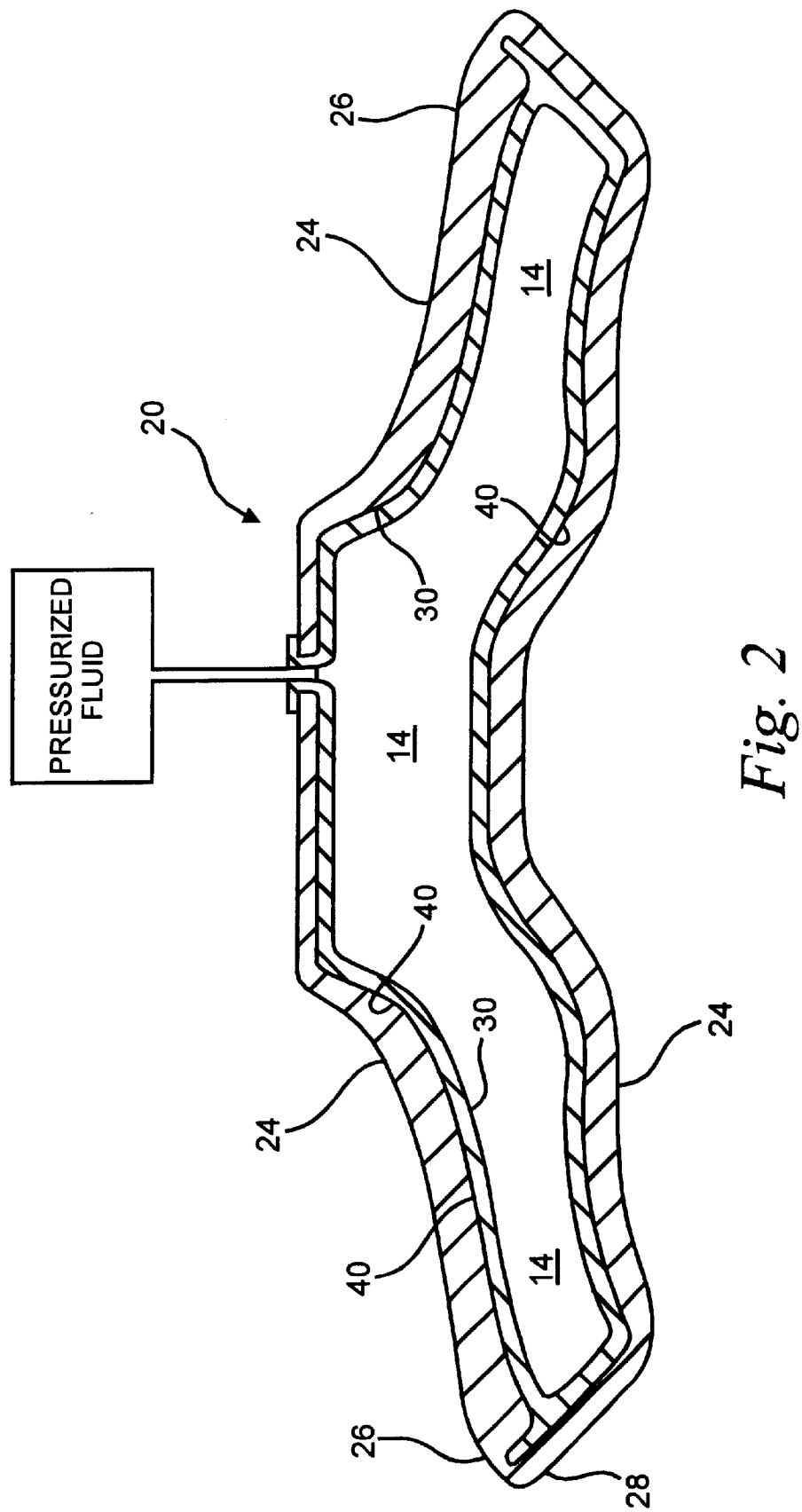
FIG. 2 is a cross-sectional view taken along line 2—2 of FIG. 1 showing the blow molded inner core of the manifold.

The method comprises first inflating a blow moldable article within an interior cavity of a first mold 24 to form the inner core 20 of the manifold 10, as shown in FIG. 2. The blow molded inner core 20 is formed using standard blow molding techniques well known to those skilled in the art. Specifically, the first mold 24 is divided into two separable mold sections 26, 28 which begin in a spaced apart relation. A parison of blow moldable thermoplastic material is then extruded as a cylindrical tube which extends between the mold sections. The parison is extruded at a high enough temperature to make the parison malleable and moldable. Next, the mold sections close together and pinch one end of the parison closed. A blow pin is then inserted within the parison to inflate the parison with pressurized air or other fluid (shown schematically in FIG. 2).

The air or other fluid used to inflate the parison is supplied at a sufficient pressure to ensure that the parison fills the entire mold cavity 30 and adopts the shape of the mold cavity 30. The pressurized air is also usually above ambient temperatures, although blow molding machines exist which utilize relatively cool air to inflate the parison. After the parison has been fully inflated, the mold sections cry) 26, 28 are separated and the blow molded article is ejected from the mold 24. FIG. 2 illustrates the blow molded inner core 20 of the present invention after the parison has been fully inflated within the mold cavity 30.

Figure 3:
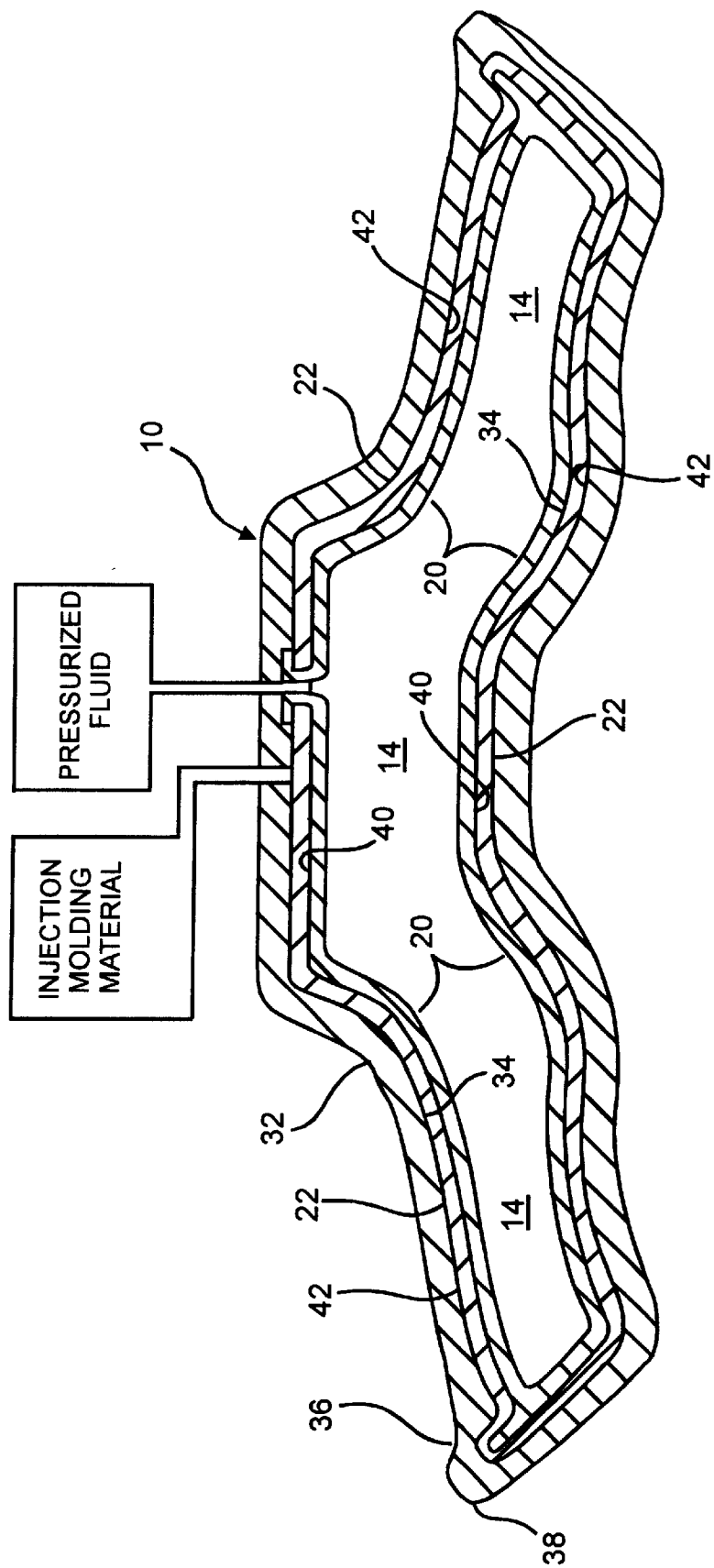
FIG. 3 is a illustrates the manifold of FIG. 2 including an injection molded outer layer surrounding the inner core.

Referring now to FIG. 3, the blow molded core 20 is next used as an insert for a subsequent injection molding step. Specifically, the core 20 is placed within an interior cavity of a second mold 32 which substantially envelops the core 20. The interior cavity 34 of the second mold 32 is larger than the interior cavity 30 of the first mold 24 and, consequently, larger than the core 20. Similar to the first mold 24, the second mold 32 is also divided into two separable mold sections 36, 38 which begin in a spaced apart relation. After the core 20 is placed within the interior cavity 34 of the second mold 32, the mold sections 36, 38 are closed tightly together.

Because the interior cavity 34 of the second mold 32 is larger than the core 20, a gap is created between an exterior surface 40 of the core 20 and an inner wall surface 42 of the second mold 32. The core 20 is supported within the second mold 32 such that the gap is of the desired thickness at all locations surrounding the core 20. As shown schematically in FIG. 3, thermoplastic fluid material is then injected at high pressure within the second mold 32 to envelop the exterior surface 24 of the core 20 and fill the gap surrounding the core 20.

During the injection molding process, pressurized fluid is applied within the core 20 (as shown schematically in FIG. 3) to maintain the shape and structural integrity of the core 20. Otherwise, the core 20 would be crushed or deformed by the external pressure of the injection molded material. Generally, the pressure at which the injection molded material is injected is an order of magnitude greater than the pressure required to inflate the core 20 in the previous step discussed above. The injection molding material is also injected at a relatively high temperature, typically higher than the melting temperature of the blow molded core 20. Thus, the pressurized fluid within the core 20 must also be applied at a sufficiently low temperature to serve as a cooling fluid to prevent the core 20 from losing structural integrity due to heat transfer from the injection molding material. The temperature selected will depend upon the melting temperature of the blow molded core 20 and the heat transfer from the injection molding material. In addition, the relative thickness of the core 20 and the injection molded outer layer 22 could affect the minimum necessary temperature.

After the injection molded material has at least partially solidified, the mold sections 36, 38 of the second mold 32 are separated and the manifold 10 is ejected therefrom. The inner core 20 and outer layer 22 are, at this point, integrally bonded together.

As an alternative to injection molding, the outer layer 22 of the manifold can formed using a urethane resin casting process. Instead of injecting thermoplastic material into the second mold 32, a glass-filled urethane resin is poured or otherwise inserted into the second mold 32 to surround the blow molded core 20. An isocyanate catalyst is applied to the resin to induce the resin to cure as a rigid urethane layer. Because the urethane resin is not necessarily injected into the second mold 32 at high pressure, the use of pressurized fluid to maintain the shape of the blow molded core 20 is less important. However, the curing process for the urethane resin is an exothermic process which yields significant heat.. Thus, a cooling fluid must still be applied within the core 20 to prevent deformation of the core 20 due to heat transfer from the resin as it is cured.

Figure 4:
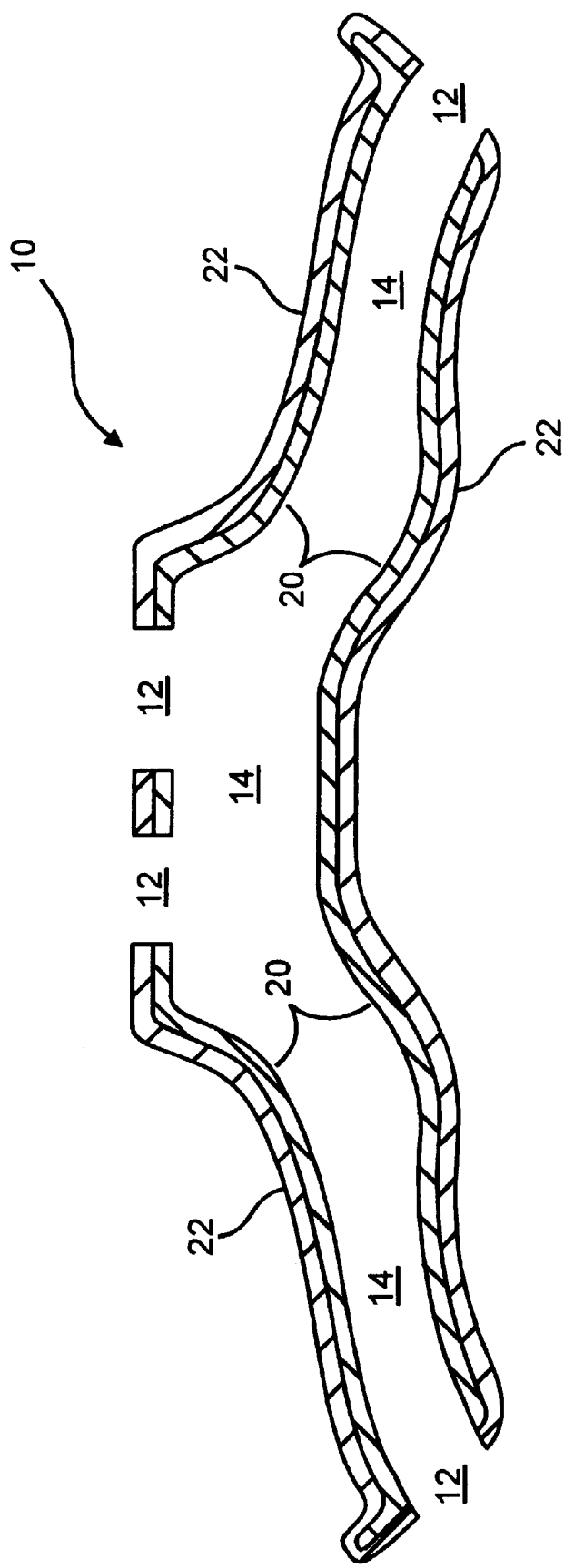
FIG. 4 illustrates the manifold of FIG. 3 after machining operations have been performed on the manifold.

As shown in FIG. 4, the manifold 10 is subsequently machined to remove excess material and create the ports 12, the threaded holes 16, and the mounting holes 18. At this stage, the manifold is ready for use.

Figure 5:
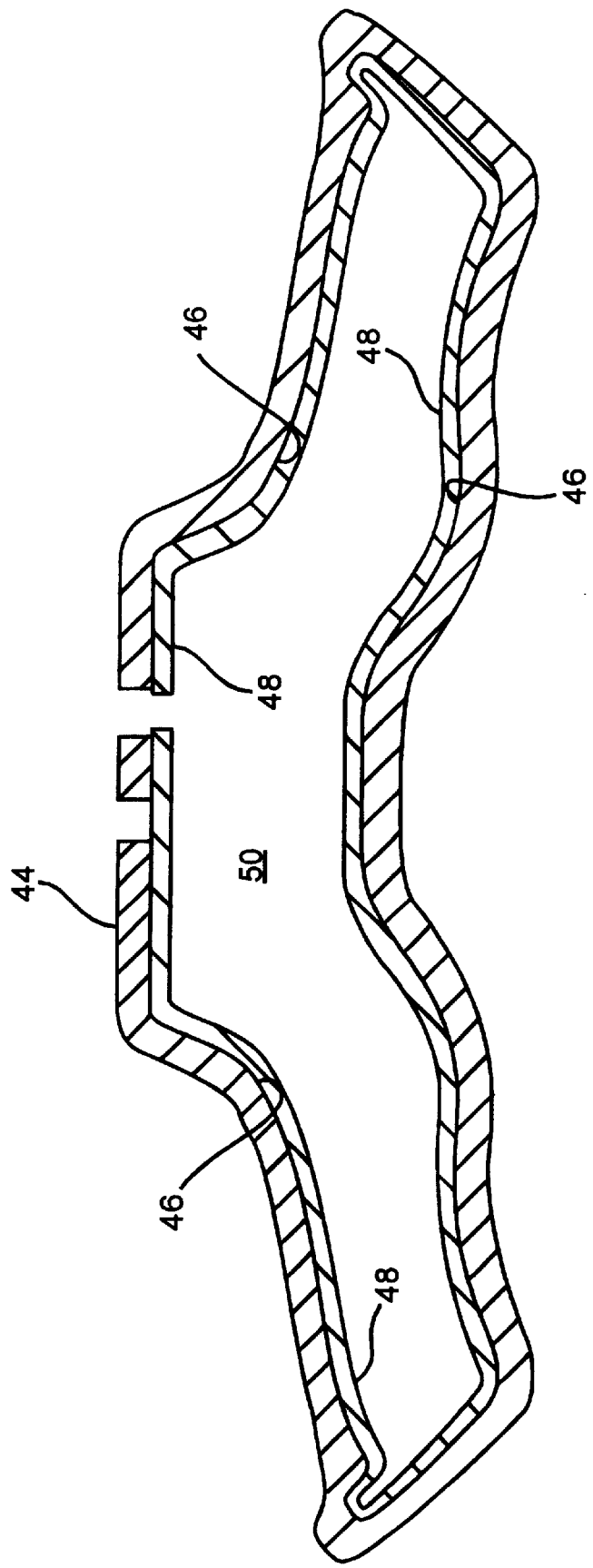
FIG. 5 is a cross-sectional view of an injection mold and mold insert of the present invention, taken along the line 2–2 of FIG. 1.

Although the method has been discussed with respect to separate first and second molds, the method could also be performed with the two molds integrated into a single mold. As shown in FIG. 5, an injection mold 44 would include an interior cavity 46 corresponding to the shape of the interior cavity 34 of the second mold 32 discussed above. A removable mold insert 48 would be provided within the injection mold 44 and define an interior cavity 50 corresponding to the shape of the interior cavity 30 of the first mold 24 discussed above. The blow molded inner core 20 would be formed using the injection mold 44 with the mold insert 48 contained therein. The mold insert 48 would then be removed to enable the injection molding step to proceed within the injection mold 44 as previously illustrated in FIG. 3.

The materials used for the inner core 20 and outer shell 22 are chosen depending upon the temperatures, pressures, and chemical compounds the manifold 10 will encounter. The inner core 20 and outer shell 22 can be the same material or different materials depending, again, upon the environment each layer will be in contact with. If different materials are used, they must be compatible to form a strong, integral bond when the moldable fluid material comes into contact with the blow molded core 20. Many plastic manifolds are currently made from glass-filled nylon, which could be used for either or both of the core 20 and shell 22.

Although the present method has been described with respect to the manufacture of a manifold, the method can be used to form any type of molded article, particularly those having a hollow interior region. The method is particularly suited for the manufacture of manifolds, however, because it allows the manifold to be shaped with a high degree of precision. Specifically, the injection molding step allows a manifold to be accurately formed having complex contours and precise mounting surfaces. Further, the use of a blow molded core insert allows the manifold to be formed as a single piece without the expense of using a metal "lost core."

The invention has been described in illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of manufacturing a molded article comprising the steps of:
   inflating a blow moldable article to form a blow molded article having an outer surface;
   inserting the blow molded article within an interior cavity of a mold;
   inserting moldable fluid material within the interior cavity of the mold adjacent the outer surface of the blow molded article;
   during said step of inserting the moldable fluid material, applying cooling fluid within the blow molded article at a temperature sufficient to maintain the shape of the blow molded article; and
   selecting the temperature of the cooling fluid based on the melting temperature of the blow molded article and the heat transfer from the moldable fluid material to prevent the blow molded article from losing structural integrity due to the heat transfer from the moldable fluid material.

2. The method as defined in claim 1, further comprising:
   inserting the blow moldable article within an interior cavity of a first mold; and
   prior to said step of inserting the moldable fluid material, inserting the blow molded article within an interior cavity of a second mold wherein the interior cavity substantially envelops the blow molded article and is larger than the interior cavity of the first mold.

3. The method as defined in claim 1 wherein the blow moldable article and the moldable fluid material comprise a thermoplastic material.

4. A The method as defined in claim 1, further comprising forming the moldable fluid material into an outer layer of a manifold and forming the blow moldable article into an inner layer of a manifold.

5. The method as defined in claim 1 wherein the moldable fluid material comprises a urethane resin.

6. The method as defined in claim 5 further comprising adding a curing catalyst to the urethane resin to cause the resin to cure in an exothermic chemical reaction.

7. The method as defined in claim 6 further comprising selecting the temperature of the cooling fluid based on the melting temperature of the blow molded article and the heat transfer from the urethane resin during exothermic curing of the urethane resin.

8. The method as defined in claim 1 further comprising:
   injecting the moldable fluid material within the interior cavity of the mold; and
   applying pressurized cooling fluid within the blow molded article at a pressure sufficient to maintain the shape of the blow molded article against the inwardly directed force of the moldable fluid material injected into the mold.

* * * * *